(12) United States Patent
Boyer

(10) Patent No.: US 8,025,007 B1
(45) Date of Patent: Sep. 27, 2011

(54) TURKEY FRYER WITH VERTICALLY STACKING COOKING RACKS

(76) Inventor: Robert L. Boyer, Detroit, MI (US)

( * ) Notice: Subject to any disclaimer, the term of this patent is extended or adjusted under 35 U.S.C. 154(b) by 0 days.

(21) Appl. No.: 12/642,393

(22) Filed: Dec. 18, 2009

(51) Int. Cl.
*A47J 37/12* (2006.01)

(52) U.S. Cl. ............... 99/339; 99/415; 99/416; 99/418; 99/448; 99/450

(58) Field of Classification Search ............ 99/416, 99/418, 415, 339, 340, 448, 450
See application file for complete search history.

(56) References Cited

U.S. PATENT DOCUMENTS

| | | | |
|---|---|---|---|
| 157,897 A | 12/1874 | Welch | |
| 1,010,037 A * | 11/1911 | Frisz | 99/418 |
| 1,266,912 A | 5/1918 | Bradbury | |
| 1,295,414 A * | 2/1919 | Bentivegna | 99/418 |
| 1,814,740 A | 7/1931 | Rapp | |
| 2,107,480 A * | 2/1938 | Holton | 126/377.1 |
| 2,186,855 A * | 1/1940 | Baccarini | 99/417 |
| 2,556,115 A * | 6/1951 | Smith | 99/417 |
| 3,503,521 A | 3/1970 | Rogus | |
| 3,627,163 A | 12/1971 | Taylor | |
| 3,859,505 A * | 1/1975 | Herbrand et al. | 219/433 |
| 4,300,686 A | 11/1981 | Leclerc et al. | |
| 4,502,374 A | 3/1985 | Davis | |
| 4,649,811 A | 3/1987 | Manganese | |
| 4,847,461 A | 7/1989 | Gilmore | |
| 5,195,424 A | 3/1993 | Guajaca | |
| 5,662,027 A | 9/1997 | Neville | |
| 5,896,810 A * | 4/1999 | Barbour | 99/415 |
| 6,085,640 A | 7/2000 | King | |
| 6,135,014 A * | 10/2000 | Chang | 99/339 |
| 6,742,446 B2 | 6/2004 | McLemore et al. | |
| 7,481,154 B2 * | 1/2009 | Murat et al. | 99/337 |
| 7,568,581 B2 | 8/2009 | Dreano | |
| 2004/0060456 A1 | 4/2004 | Chung | |

* cited by examiner

*Primary Examiner* — Reginald L Alexander
(74) *Attorney, Agent, or Firm* — Steve M. Clemmons

(57) ABSTRACT

The present invention is a deep frying apparatus for cooking food items within a deep stock pot. The apparatus includes a pot-shaped basket and a plurality of stackable cooking racks with flat screen bodies and spaced handles which project vertically from the screens and which concomitantly provide a loop for handling each rack and for spacing apart adjacent stacked racks. A bottom-most cooking rack further includes feet which raises the bottom-most rack's screen above a bottom wall of the basket when inserted therein.

13 Claims, 3 Drawing Sheets

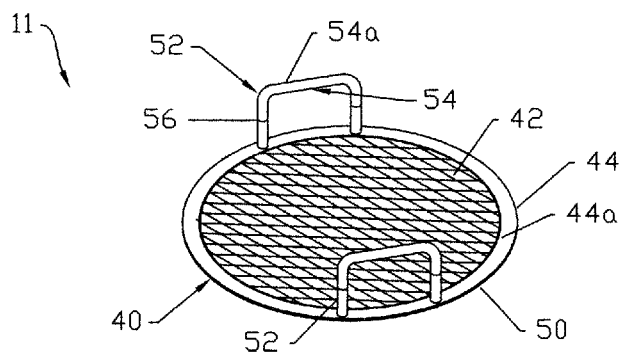
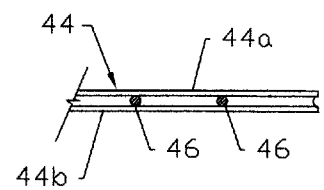
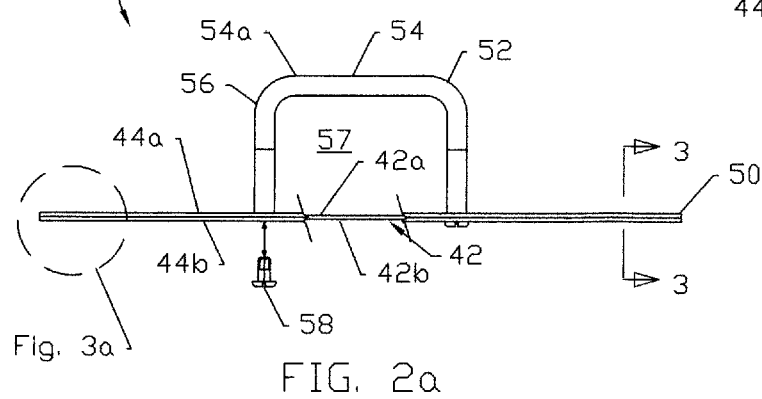
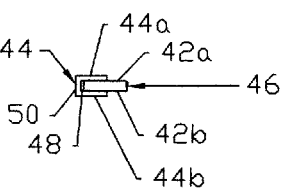
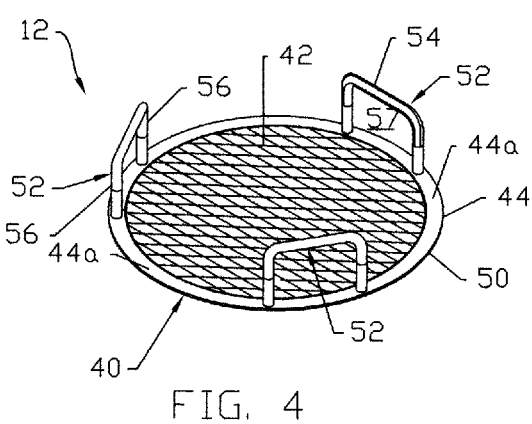
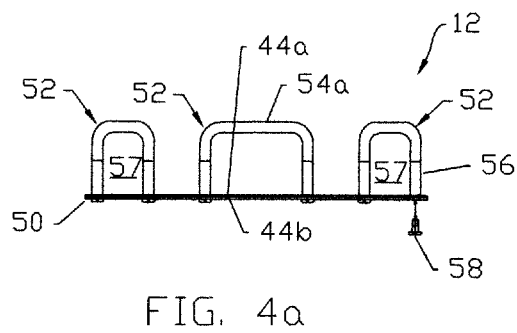

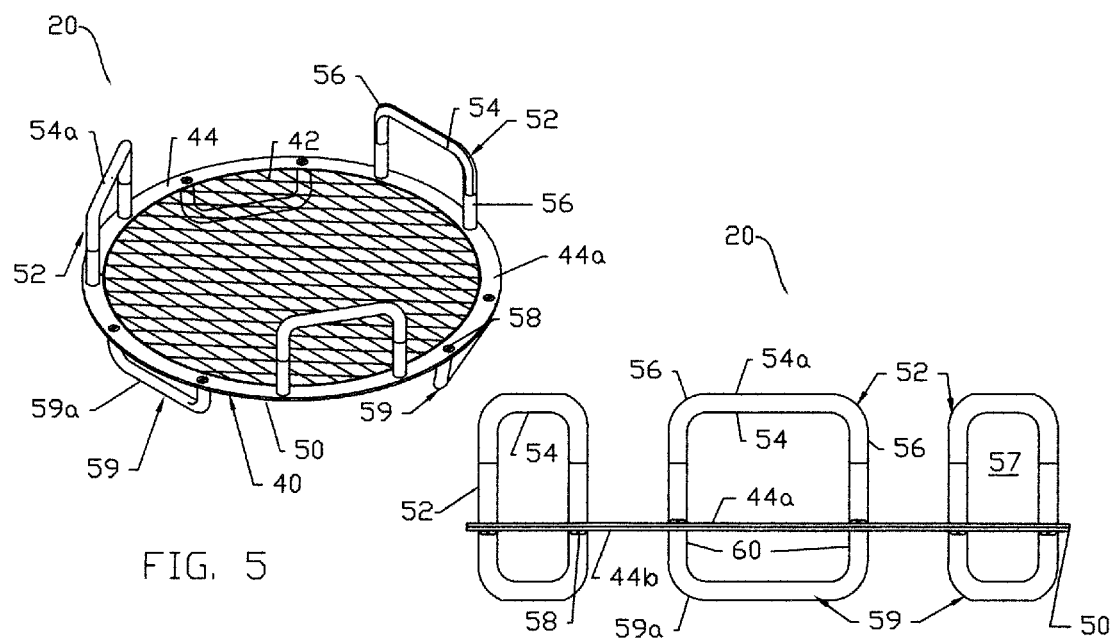
FIG. 5
FIG. 5a
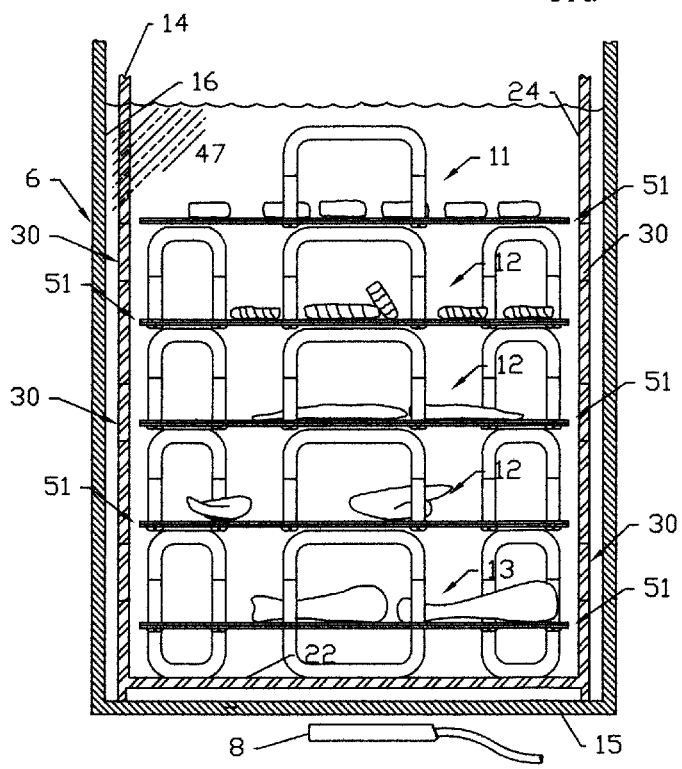
FIG. 6

TURKEY FRYER WITH VERTICALLY STACKING COOKING RACKS

FIELD OF THE INVENTION

The present invention relates to cooking implements and more particularly to deep fryers.

BACKGROUND AND SUMMARY OF THE INVENTION

A popular new trend in cooking is that individuals and families have started to deep fry whole turkeys rather than more traditional cooking techniques, such as roasting. In response to this trend, a number of turkey-frying specific cooking vessels have been introduced. These "turkey fryers" include a deep, relatively narrow stock pot which is sized to receive a whole turkey. The turkey is lowered into the pot immersing it into heated cooking oil. In addition to the taste and relatively rapid cook time, this popularity is based in-part on the portable nature of these turkey fryers, which are typically heated using a propane-fueled fire.

One disadvantage of current turkey fryers is that they are used infrequently. One of the reasons for their infrequent use is that a whole cooked turkey is generally considered a food for special occasions, such as holidays. Furthermore, the turkey fryer's inherent depth and relatively large cooking oil requirements result in turkey fryer owners finding other cooking implements to prepare their "everyday" foods, such as chicken wings, breaded fish, or French fries. Presently, fryer baskets are provided to cook "non-turkey" foods in these fryers, but these baskets are cumbersome, relatively expensive, and difficult to load and unload. Additionally, these baskets do not provide for any separation of the food items being cooked. Consequently, the cooked food may be stuck together or uncooked as cooking oil may not fully surround each food item.

There is therefore a need for a system and method for utilizing a turkey fryer for cooking various and disparate foods simultaneously. The system including a plurality of stackable racks, each having individual lifting brackets which concomitantly operate as spacers between adjacent stacked racks to maintain separation of the food items. These stackable racks in combination with a cooking basket, the turkey fryer pot and portable heat/fuel source advantageously provide a user with a cooking apparatus that can be used much more frequently than traditional turkey fryers thereby increasing the overall utility and usefulness over these mainstream fryers.

The present invention provides a plurality of stackable cooking racks having wire mesh bodies for supporting various food items. Each wire mesh body is supported around its outer periphery by a metal border or edging, which provides stiffness and encloses the individual wire strands of the mesh. Each rack further includes a number of handle loops which extend from the border. The handles each have a hand-sized bail running parallel to the mesh body, which acts as both a grip for handling the rack and as a rest for another rack when the racks are stacked together. The handle's bail is offset a distance from the mesh body to allow sufficient space for food items to fit between stacked racks and to allow cooking oil to flow up and around each food item.

It is an advantage of the present invention to provide a novel combination for deep frying food items in a cooking fluid. The combination comprising: a cooking basket having a bottom surface and a sidewall extending upwardly from the bottom surface, the sidewall and bottom surface cooperating to define an interior cavity; a pot which is shaped complementary to and is sized to receive the cooking basket within an interior opening; and a plurality of cooking racks, each rack comprising: a flat body having a wire mesh screen and a border which encloses a periphery of the screen, the border having an outer edge which is complementarily shaped with the sidewall; and a plurality of spaced handles mounted to the body. Each of the handles including an elongated bail which is parallel to the body, wherein each of the bails have an uppermost surface and each of the uppermost surfaces are coplanar. The cooking racks are stackable upon each other vertically such that each stacked cooking rack rests upon the uppermost surfaces of the adjacent lower cooking rack.

It is another advantage of the present invention to provide an improved frying apparatus for deep frying food items within a pot sized to receive a whole turkey. The improvement comprising: a cooking basket shaped complementary to the pot having a vertical sidewall and a bottom wall which cooperate to define a cylindrical cooking cavity; and a plurality of cooking racks, each rack comprising a flat body having a wire mesh screen and a border which encloses the periphery of the screen. The border having a circular outer edge which is sized to leave a continuous gap between the outer edge and the sidewall of the basket that is between one-quarter inch to one-half inch when the cooking rack is centered within the cooking basket. Each rack further comprising a plurality of handles equally spaced around and mounted to a top surface of the border. Each of the handles including an elongated bail which is parallel to the body, wherein the bails have coplanar uppermost surfaces. The cooking racks are stackable upon each other vertically such that each stacked cooking rack abuts the coplanar uppermost surfaces of the adjacent lower cooking rack.

These and other objects, features and advantages of the present invention will become apparent from the following description when viewed in accordance with the accompanying drawings.

BRIEF DESCRIPTION OF THE DRAWINGS

The description refers to the accompanying drawings in which like reference characters refer to like parts throughout the several views, and in which:

FIG. 2 is a perspective view of a top rack;

FIG. 2a is a side view of a top rack;

FIG. 3 is a sectional view through line 3-3 in FIG. 2a;

FIG. 3a is a sectional view through line 3a-3a in FIG. 2a;

FIG. 4 is a perspective view of an intermediate rack;

FIG. 4a is a side view of an intermediate rack;

FIG. 5 is a perspective view of a bottom rack;

FIG. 5a is a side view of a bottom rack; and

FIG. 6 is a side sectional view of the stack cooking racks inserted within the cooking basket, which is nested within the cooking pot.

DETAILED DESCRIPTION OF THE INVENTION

Figure 1:
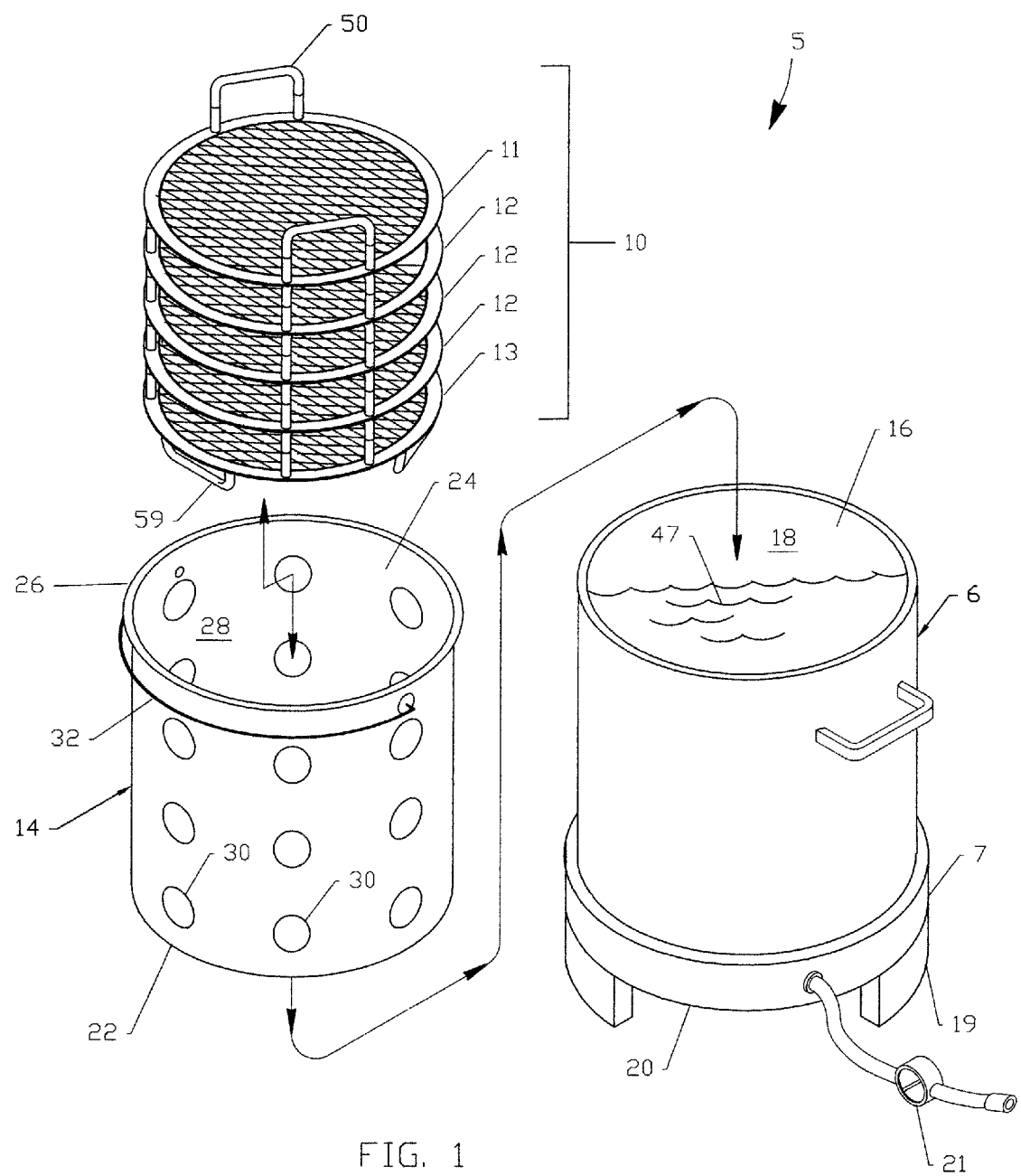
FIG. 1 is a perspective view of the stacked cooking racks, cooking basket, and cooking pot.

Referring now to FIGs., the present invention is an improved turkey fryer 5 comprising a cooking vessel or stock pot 6; a stand 7 including a heating source 8; a food support portion 10 comprising a plurality of stackable cooking racks 11, 12, and 13; and a cooking basket 14.

Pot 6 is a relatively deep cooking pot having a capacity of from twenty-six quarts to thirty-two quarts with an internal diameter from ten inches to fourteen inches and is sized to accommodate a large food item, such as a whole turkey. Pot 6 is generally cylindrical in shape and includes a bottom surface 15 and a sidewall 16 that extends upwardly from the bottom surface 15 to a top edge of the sidewall. The sidewall 16 and bottom surface 15 cooperate to define an interior opening 18 of the pot 6.

Stand 7 is conventional in design, having support legs 19 and a body 20 that supports pot 6. A fuel inlet 21 which is adapted to be coupled to a fuel source, such as a propane tank (not shown) extends out from the stand 7. The fuel inlet 21 provides fuel to heat source 8, such as a burner.

Cooking basket 14 is complementary in shape to pot 6, being generally cylindrical and having a bottom wall 22 and a substantially vertical sidewall 24 that extends upwardly from the bottom wall 22 to a top edge 26 of the sidewall 24. Like pot 6, the sidewall 24 and bottom wall 22 define a basket interior opening or cooking cavity 28. Cooking basket 14 also includes a plurality of apertures 30 formed through the sidewall 24. Apertures 30 are sized to allow cooking fluid to readily pass therethrough when the cooking basket 14 is inserted within pot opening 18 and are, in one embodiment, approximately one-half inch in diameter. Cooking basket 14 is preferably sized to be only slightly smaller than the pot opening 18 to maximize food capacity and to ensure that most of the cooking fluid in the pot 6 flows into the cooking cavity 28 of the cooking basket 14 through apertures 30. A handle 32 is mounted to the upper end of the sidewall 24 for lifting the basket 14 to insert/extract the basket into/from the pot 6.

Food support portion 10 preferably includes a top rack 11, at least one intermediate rack 12, and a bottom rack 13. In one preferred embodiment, three intermediate racks 12 are provided in portion 10.

Each rack 11-13 includes a substantially identical body or screen 40 comprising a wire mesh or grid 42 that is covered along its outermost edge by a solid metal border 44 wrapped over the top surface 42a and bottom surface 42b of the grid 42.

As best shown in FIGS. 3 and 3a, grid 42 is preferably a metal wire lattice formed from a first row of evenly spaced individual wire strands 46 interwoven with another row of wires 46 running at an angle relative to the first row. The spacing between parallel adjacent wires 46 is preferably less than ½ inch, but greater than ⅛ inch to ensure that food items do not fall through the grid 42, while allowing a cooking fluid 47 (e.g., cooking oil) to readily flow through the grid 42. Border 44 is preferably a continuous U-shaped channel that is formed around the outermost edge 48 of the grid 42. The resulting shape of each screen 40 is relatively flat and round. Importantly, each rack 11-13 has an outer diameter that is only from one-quarter inch to one-half inch smaller than the inner diameter of cooking basket 14. In this manner, as shown in FIG. 6, the edge 50 of each rack 11-13 remains in close proximity to all sides of sidewall 24 and leaving a limited gap 51, while allowing the racks 11-13 to readily fit within opening 28.

Each rack 11-13 also includes at least two spacer handles 52 extending vertically from the top surface 44a of the border 44. Handles 52 are equally spaced around the circular screen 40 and have an elongated bail 54 extending from spaced upright posts 56. Posts 56 are preferably spaced apart a distance (approximately three inches) such that bail 54 has a longitudinal length that is sufficient to allow a person's hand to fit between the posts 56, while gripping the bail 54. Posts 56 have a height of approximately two inches to provide adequate spacing for food items to be placed upon the screen 40. In one non-limiting embodiment, bail 54 and posts 56 have a generally cylindrical shape with the ends of the bail continuously depending from the ends of posts 56. In this manner, the handles 52, along with the border 44 define a closed loop 57 which can be grasped by a user either by hand or via an extraction/placement tool (e.g., a metal hook).

Importantly, the uppermost surface 54a of bail 54 is parallel to the screen 40 with each of the surfaces 54a of a particular rack 11-13 substantially coplanar to cooperatively define a flat resting surface or rest. In this manner, and is best shown in FIG. 6, when the racks 11-13 are stacked vertically, the upper surfaces 54a of a vertically lower rack (e.g., the uppermost intermediate rack 12) each abut the bottom surface 44b of the rack immediately there-above (e.g., rack 11) to provide a stable base for the upper rack(s).

In the embodiment illustrated in the FIGs., each handle 52 is coupled to the screen 40 by a mechanical fastener, such as a bolt 58, which passes through the side of the border 44 opposite to the handle 52 (i.e., bottom surface 44b) and into the a complementarily formed threaded hole (not shown) formed concentrically with the cylindrical post 56.

In the embodiment illustrated in the FIGs., intermediate rack 12 and bottom rack 13 each comprise three handles 52, while top rack 11 only has two handles 52. It should be appreciated by one skilled in the relevant art that the precise number and configuration of handles can vary as long as the handles 52 provide a stable surface for stacking a plurality of the racks 11-13 together. Rack 11, being intended to be only utilized on the top of support portion 10 is provided with only two handles 52 to reduce cost, while allowing a user to readily extract and insert the rack from/within the cooking basket 14.

Referring now to FIGS. 5 and 5a, the bottom rack 13 further comprises a plurality of legs 59 equally spaced around and extending from the bottom surface 44b of border 44. Legs 59 each have the same general construction as handles 52, with an elongated foot 59a spanning vertical posts 60. Posts 60, in this embodiment are only approximately one inch in height to reduce the overall height of rack 13, while allowing sufficient space between bottom surface 42a and the bottom surface 22 of cooking basket 14 to allow cooking fluid 47 to fully cook the food items located upon the bottom rack 13. Like handles 52, three legs 59 are provided in the embodiment illustrated in the FIGs. While three legs 59 are illustrated, it should be further appreciated that substantially any number and configuration for the legs may be provided to form a stable base for the stacked racks 11-13 of support portion 10, while providing sufficient space for the cooking fluid 47 to flow up through grid 42 of bottom rack 13.

In operation, a user can load each rack 11-13 with different (or the same) food items for deep fry cooking. The racks 11-13 are then stacked together by inserting them within the cooking cavity 28 of the cooking basket 14. Bottom rack 13 is inserted first with the feet 59a resting upon the bottom surface 22 of the cooking basket 14. Intermediate racks 12 are stacked atop the bottom rack 13 and are topped by top rack 11 at the top of the stack. Stacking the racks results in the upper surface 54a of each rack to abut and support the immediately adjacent rack at the solid border 44. When the racks have been stacked, a user lifts the cooking basket 14 containing the entire food support portion 10 by handle 32 and lowering the basket 14 and portion 10 into the pot 6 containing the cooking fluid 47 until the bottom surface 22 rests upon bottom surface 15 of the pot 6. Alternatively, the user can insert less than a whole food support portion 10 by immersing only an individual or a few stacked racks into cooking basket 14 prior to insertion into the pot 6. Removal of the cooking basket 14 and racks 11-13 is accomplished by reversing the above insertion technique.

From the foregoing description, one skilled in the art will readily recognize that the present invention is directed to an improved system and method for cooking food items within a deep vessel fryer. While the present invention has been described with particular reference to various preferred embodiments, one skilled in the art will recognize from the foregoing discussion and accompanying drawing that changes, modifications and variations can be made in the present invention without departing from the spirit and scope thereof.

The invention claimed is:

1. A combination for deep frying food items in a cooking fluid, comprising:
   a cooking basket having a bottom surface and a sidewall extending upwardly from the bottom surface, the sidewall and bottom surface cooperating to define an interior cavity;
   a pot which is shaped complementary to and is sized to receive said cooking basket within an interior opening; and
   a plurality of cooking racks, each rack comprising:
      a flat body having a wire mesh screen and a border which encloses a periphery of the screen, said border having an outer edge which is complementarily shaped with said sidewall; and
      a plurality of spaced handles mounted to said body, each of said handles including an elongated bail which is parallel to said body, wherein each of said bails have an uppermost surface and each of said uppermost surfaces are coplanar;
   wherein said cooking racks are stackable upon each other vertically such that each stacked cooking rack rests upon the bail uppermost surfaces of the adjacent lower cooking rack and wherein one of said cooking racks comprises a bottom cooking rack, said bottom cooking rack further comprising a plurality of spaced legs mounted to a bottom side of said body, each of said legs including an elongated foot which is parallel to said body.

2. A combination as defined in claim 1, wherein each of said handles includes a pair of vertical uprights which project from an upper surface of said border, said bail depending from each of said uprights to cooperatively define a loop.

3. A combination as defined in claim 1, wherein said plurality of handles are equally spaced around said border.

4. A combination as defined in claim 1, wherein each of said racks is sized to leave a continuous gap between said outer edge and said sidewall of the cooking basket that is between one-quarter inch to one-half inch when said cooking rack is centered within said interior cavity.

5. A combination as defined in claim 4, wherein said sidewall is cylindrical and said outer edge is circular.

6. A combination as defined in claim 1, wherein each of said bails contacts only the border of an adjacent upper cooking rack when said cooking racks are stacked and inserted within said cooking basket.

7. A combination as defined in claim 1, wherein each handle further comprises spacer means which separates each of said bails from said body at least two inches to permit food items to fit between adjacent screens and allows cooking fluid within said pot to substantially surround said food item when said cooking basket is nested within said pot and said cooking racks are stacked and inserted within said cooking basket.

8. A combination as defined in claim 1, further comprising:
   a burner having a propane fuel tank inlet; and
   means for vertically supporting said pot over said burner.

9. An improved frying apparatus for deep frying food items within a pot having vertical walls defining a cylindrical opening that is sized to receive a whole turkey, the improvement comprising:
   a cooking basket shaped complementary to said cylindrical opening having a vertical sidewall and a bottom wall which cooperate to define a cylindrical cooking cavity; and
   a plurality of cooking racks, each rack comprising:
      a flat body having a wire mesh screen and a border which encloses a periphery of the screen, said border having a circular outer edge which is sized to leave a continuous gap between said outer edge and said sidewall that is between one-quarter inch to one-half inch when said cooking rack is centered within said cylindrical cooking cavity; and
      a plurality of handles equally spaced around and mounted to a top surface of said border, each of said handles including an elongated bail which is parallel to said body, wherein said bails have coplanar uppermost surfaces;
   wherein said cooking racks are stackable upon each other vertically such that each stacked cooking rack abuts the coplanar uppermost surfaces of the bails of the adjacent lower cooking rack and wherein one of said cooking racks comprises a bottom cooking rack, said bottom cooking rack further comprising a plurality of spaced legs mounted to a bottom side of said body, each of said legs including an elongated foot which is parallel to said body.

10. An improved frying apparatus as defined in claim 9, wherein each of said handles includes a pair of vertical uprights which project from an upper surface of said border, said bail depending from each of said uprights to cooperatively define a loop.

11. An improved frying apparatus as defined in claim 10, wherein said uprights separate each of said bails from said body at least two inches to permit food items to fit between adjacent screens and allows cooking fluid within said pot to substantially surround said food item when said cooking basket is inserted within said cylindrical opening and said cooking racks are stacked within said cooking basket.

12. A improved frying apparatus as defined in claim 9, wherein each of said bails contacts only the border of an adjacent upper cooking rack when said cooking racks are stacked and inserted within said cooking basket.

13. A improved frying apparatus as defined in claim 9, further comprising:
   a burner having a propane fuel tank inlet; and
   means for vertically supporting said pot over said burner.

* * * * *